C. C. BLACKMORE.
SHOCK ABSORBER.
APPLICATION FILED FEB. 7, 1921.
1,395,471.
Patented Nov. 1, 1921.
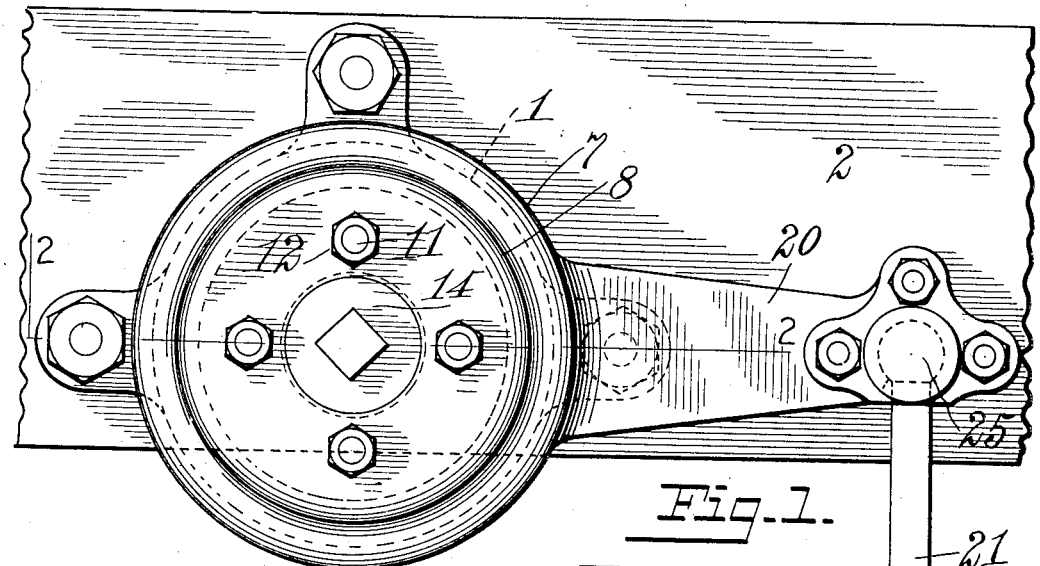
Fig. 1.
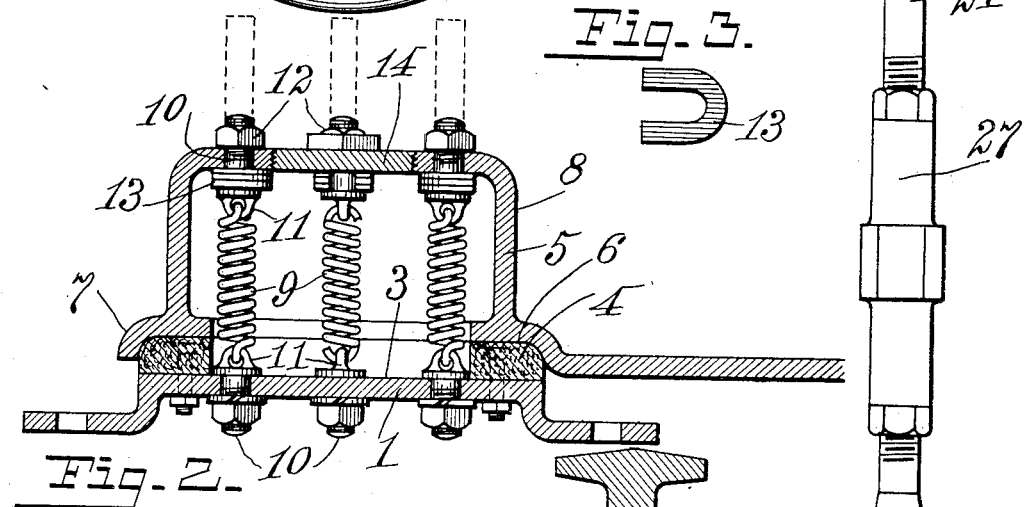
Fig. 2.
Fig. 3.
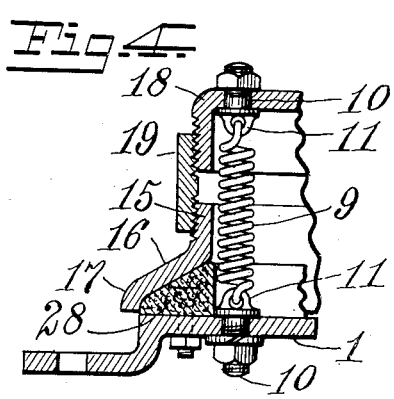
Fig. 4.
INVENTOR
C. C. BLACKMORE
By Leonard Reed
INVENTOR

UNITED STATES PATENT OFFICE.

CHARLES C. BLACKMORE, OF DAYTON, OHIO.

SHOCK-ABSORBER 1,395,471. Specification of Letters Patent. Patented Nov. 1, 1921.

Application filed February 7, 1921. Serial No. 442,984.

*To all whom it may concern:*

Be it known that I, CHARLES C. BLACKMORE, a citizen of the United States, residing at Dayton, in the county of Montgomery and State of Ohio, have invented certain new and useful Improvements in Shock-Absorbers, of which the following is a specification, reference being had therein to the accompanying drawing.

This invention relates to a shock absorber for vehicles.

One object of the invention is to provide a shock absorber which will be simple in its construction, inexpensive to manufacture and highly efficient in operation.

A further object of the invention is to provide a shock absorber of such a construction that the parts will not wear away or become loose in service so as to rattle or to affect the efficiency of the device.

A further object of the invention is to provide such a device in which the frictional resistance to the movement of the movable member thereof will increase progressively with the movement of that member.

Other objects of the invention will appear as the device is described in detail.

In the accompanying drawings Figure 1 is a side elevation of a shock absorber embodying my invention, including the means for attaching the same to a vehicle; Fig. 2 is a sectional view taken on the line 2—2 of Fig. 1 with the end of the arm broken away; Fig. 3 is a detail view of one of the shims; and Fig. 4 is a fractional sectional view of a modified form of the device.

In these drawings I have illustrated one embodiment of my invention and have shown the same as comprising a fixed member or base 1, adapted to be rigidly secured to a part of the vehicle, such as one of the frame members 2. This fixed member, as here shown, is provided with a flat bearing surface 3 and is so shaped that this bearing surface is spaced outwardly some distance from the frame member on which the device is mounted. The base may be either a casting or a stamping. The fixed member is provided with a friction surface which is preferably in the form of a friction element rigidly secured thereto and which, in that form of the device here shown, is annular in form, as shown at 4, the external diameter of the friction element being approximately equal to or slightly greater than the external diameter of the bearing surface of the fixed member 1. Mounted on the fixed member for rotation about an axis extending transversely thereto is a movable member 5 which has a bearing surface 6 resting upon the friction element 4. The movable member may be guided in its rotation by any suitable means but I prefer to so construct the device as to eliminate the usual bolt or bearing pin upon which the movable member rotates, because the bearing between these parts will wear away in a very short time to such an extent that the device will rattle and eventually the efficiency of its operation is seriously affected. I have, therefore, shown the movable member as having an inwardly extending flange 7 which embraces the outer edge of the annular friction element 4, thus causing the movable member to be guided by the friction element and to rotate about the axis thereof.

The movable member is caused to frictionally engage the friction element 4 by means of a resilient device so arranged that the pressure of the movable member on the friction element will increase progressively with the rotation of said movable member in either direction and I prefer that this connection should comprise a plurality of springs, the tension of which will be increased as the movable member rotates from its normal position in either direction.

As shown in the present construction the movable member comprises a part, in the present instance in the form of a housing 8, which extends outwardly from the friction surface 6 thereof and is provided at its outer end with a transverse portion. That portion of the movable element which has the friction surface and the flange 7 is here shown as annular in form and the housing is in the form of an annular web rigidly secured to and extending outwardly from this annular portion of the member. This movable member may be formed of a casting in which case the parts thereof will be cast in one piece or it may be formed of stampings, in which case it would probably be formed in two or more parts and these parts rigidly connected one to the other. Arranged within the housing of the movable member and extending through the annular portion thereof and through the annular friction element are a plurality of springs 9 which are connected at their inner ends with the fixed member or base 1 and at their outer ends with the transverse portion of the housing of the movable member and are so arranged that they will be at all times under tension, thus causing the movable member to exert constant pressure upon, and thus maintain a firm frictional contact with, the friction element 4. The springs are so arranged that when the movable member is rotated the distance between the points of connection of the respective springs with the two members will be increased and the springs thereby placed under increased tension, thus causing the friction surface of the movable member to engage the friction element 4 with a progressively increasing pressure, and offering increased resistance to the movement of the movable member. To this end the springs, of which there may be any suitable number, are preferably so arranged that when the movable member is in its normal position they will extend substantially parallel with its axis of rotation and will be spaced a considerable distance from that axis. The springs may be connected with the members in any suitable manner but as here shown I have mounted in the fixed member 1 bolts 10 having at their inner ends eyes 11 and provided at their outer ends with nuts 12 by means of which they may be rigidly and permanently secured to the fixed member and the adjacent ends of the respective springs hooked into the eyes of the bolts. Similar bolts are mounted in the transverse portion of the housing 8 and the outer ends of the springs are hooked into the eyes of the bolts. To facilitate the assembly of the device means may be provided for placing the springs under tension after they have been connected with the respective bolts. This may be done in various ways, as for example by providing the bolts 10 for the housing 8 of a relatively great length so that they may be inserted in the housing 8 and the springs connected therewith before the latter are placed under tension. By then tightening down the nuts on the bolts the springs may be placed under the desired tension and secured in position. Then, if desired, the ends of the bolts which project beyond the nuts 12 may be cut off. If desired, washers, or shims, 13 may be inserted between the inner heads of the bolts and the transverse portion of the housing to permit of the tension on the springs being subsequently increased and at the same time to provide a very rigid permanent connection between the bolts and the housing. By making the shims U-shaped, as shown in Fig. 3, they can be slipped out of engagement with the bolt without the necessity of removing the bolt from the housing. To permit access to be had to the interior of the housing the latter is provided with an opening in the transverse portion thereof which is normally closed by a screw threaded plug, or cap, 14, thus rendering the device as a whole dirt proof.

The tension of the springs may be adjusted in other ways and in Fig. 4 I have shown a modified form of the device in which the housing is divided transversely into two parts, an inner part 15 carrying the transverse portion, or friction surface 16 and the flange 17, and an outer portion 18 in which the connecting devices for the springs are mounted. The circumferential walls of the two parts of the housing are provided with external threads, and a sleeve, or collar, 19 is mounted on the threaded portions of the two parts of the housing. The threads on the two parts of the housing extend in opposite directions so that by turning the collar, or sleeve, 19 in one direction or the other the two parts of the housing may be moved toward or away from each other and the tension on the springs 9 thus adjusted.

It will be noted that in that form of the device shown in Fig. 4 the friction element, 28, has its contact surface arranged obliquely to its axis and that the transverse portion of the movable member has its contact surface arranged parallel with this oblique surface of the friction element. The transverse portion of the movable member projects laterally from the outwardly extending portion, or housing, of the movable member so that this outwardly extending portion extends substantially in line with the inner edge of the friction element. The transverse portion 16 of the movable member is provided with the flange 17 to embrace the edge of the friction element in substantially the same manner as shown in Fig. 2. This construction has certain advantages over that shown in Fig. 2. For example, the oblique arrangement of the contact surfaces results in a wedging action between the movable member and the friction element which increases the frictional resistance to the relative movements of the two parts. Further, by arranging the contact surfaces of the friction element obliquely to its axis the desired area of frictional surface may be secured with a friction element of less width and this enables the springs to be mounted at a greater distance from the center.

The movable member of the device may be connected with the vehicle in any suitable manner. In the present instance, it is provided with an arm 20 extending laterally therefrom and connected at its outer end with a rod 21, the lower end of which is connected with a stud 22 rigidly secured by means of clamping devices 23 with the axle 24 of an automobile. The rod 21 is preferably connected with the arm 20 and the stud 22 by means of universal joints, as shown at 25 and 26, and may also be provided with a turn buckle 27 by means of which its length may be adjusted to accommodate it to different installations.

While I have shown and described one embodiment of my invention I wish it to be understood that I do not desire to be limited to the details thereof as various modifications may occur to a person skilled in the art.

Having now fully described my invention what I claim as new and desire to secure by Letters Patent is:

1. In a device of the character described, a fixed member, a movable member rotatably mounted on said fixed member, said members having opposed friction surfaces, and said movable member having a part spaced from said fixed member, and a yieldable device extending between and connected with said part of said movable member and said fixed member to press said friction surfaces one against the other.

2. In a device of the character described, a fixed member, a movable member rotatably mounted on said fixed member, said members having opposed friction surfaces, and said movable member having a part spaced from said fixed member, and a yieldable device extending between and connected with said part of said movable member and said fixed member, said yieldable device being arranged to cause said friction surfaces to engage one another with progressively increasing pressure as said movable member is rotated from its normal position.

3. In a device of the character described, a fixed member, a movable member rotatably mounted on said fixed member, said members having opposed friction surfaces and said movable member having a part spaced from said fixed member, and springs extending between and connected with said part of said movable member and said fixed member to press said friction surfaces one against the other.

4. In a device of the character described, a fixed member, a movable member rotatably mounted on said fixed member, said members having opposed friction surfaces and said movable member having a part spaced from said fixed member, and springs extending between and connected with said part of said movable member and said fixed member, said springs forming the sole connection between said members.

5. In a device of the character described, a fixed member, a movable member rotatably mounted on said fixed member, a friction element interposed between said members, and springs forming the sole connection between said members.

6. In a device of the character described, a fixed member, a movable member rotatably mounted on said fixed member, said members having opposed friction surfaces, a yieldable connecting device carried by said fixed member and acting on said movable member, and other means to guide said movable member in its rotation on said fixed member.

7. In a device of the character described, a fixed member, a movable member rotatably mounted on said fixed member and having means to guide it in its rotation thereon, and means independent of said guiding means to connect said members one to the other and cause said friction surfaces to yieldably engage one another.

8. In a device of the character described, a fixed member having a friction surface, a movable member rotatably mounted on said fixed member and having an annular friction surface to coöperate with the friction surface of said fixed member, and a device connected with said fixed member, arranged within said annular friction surface of said movable member and acting on said movable member to yieldably hold said friction surfaces in coöperative relation.

9. In a device of the character described, a fixed member having a friction surface, a movable member rotatably mounted on said fixed member and having an annular friction surface to coöperate with the friction surface of said fixed member, and a plurality of devices connected with said fixed member, arranged within the annular friction surface of said movable member, spaced one from the other and from the axis of said movable member and acting on said movable member to yieldably hold said friction surfaces in coöperative relation.

10. In a device of the character described, a fixed member, a movable member rotatably mounted on said fixed member, said members having opposed friction surfaces, said movable member having a part spaced from said fixed member, and springs connected with said part of said movable member and with said fixed member to yieldably hold said friction surfaces in coöperative relation.

11. In a device of the character described, a fixed member, a movable member rotatably mounted on said fixed member, a friction element interposed between said members, and springs forming the sole connection between said members and so arranged that the rotation of said movable member will place said springs under increased tension.

12. In a device of the character described, a fixed member, an annular friction element carried by said fixed member, a movable member mounted for rotation about the axis of said friction element, having a friction surface to engage said friction element, and having a part extending outwardly from said friction element and spaced from said fixed member, and yieldable means extending through said friction element and connecting said part of said movable member with said fixed member.

13. In a device of the character described, a fixed member, an annular friction element carried by said fixed member, a movable member mounted for rotation about the axis of said friction element, having an annular friction surface to engage said friction element and having a part extending outwardly from said friction surface, and springs each connected at one end with said part of said movable member and at the other end with said fixed member, said springs extending through said annular friction element and forming the sole connection between said members.

14. In a device of the character described, a fixed member, an annular friction element carried by said fixed member, a movable member mounted for rotation about the axis of said friction element, having a friction surface to engage said friction element, and having a part extending outwardly from said friction surface, springs for connecting said part of said movable member and with said fixed member, and means for adjusting the tension of said springs.

15. In a device of the character described, a fixed member, an annular friction element carried by said fixed member, a movable member mounted for rotation about the axis of said friction element, having an annular friction surface to engage said friction element and having a part extending outwardly from said friction surface, and springs each connected at one end with said part of said movable member and at the other end with said fixed member, said springs being arranged substantially parallel with and spaced from the axis of rotation of said movable member.

16. In a device of the character described, a fixed member, a movable member rotatably mounted on said fixed member, a friction element arranged between said members, one of said members having a flange overlapping the edges of said friction element, said members having parts spaced one from the other, and a yieldable device extending between and connected with said parts to press said members against said friction element.

17. In a device of the character described, a fixed member, a movable member rotatably mounted on said fixed member and having a part spaced from said fixed member, an annular friction element arranged between said members and secured to one of them, the other of said members having a flange overlapping the edge of said friction element, and springs extending between and connected with the spaced parts of said members to press the latter in engagement with said friction element.

18. In a device of the character described, a fixed member, a circular friction element mounted on said fixed member, a movable member mounted for rotation about the axis of said friction element, having a friction surface to engage said friction element and having a circumferential flange to embrace the edge of said friction element, and springs to cause said movable member to exert pressure on said friction element, said springs forming the sole connection between said movable member and said fixed member.

19. In a device of the character described, a fixed member, an annular friction element carried by said fixed member, a movable member mounted for rotation about the axis of said friction element, and comprising an annular portion having a friction surface to engage said friction element, and a housing extending outwardly from said annular portion, said annular portion having at its edges flanges to embrace the edge of said friction element, springs connecting said housing with said fixed member, said housing being divided transversely into two parts and said parts being provided respectively with right and left hand screw threads, and a sleeve mounted on said threaded portions of the two parts of said housing, whereby said parts may be moved toward or from each other to regulate the tension of said springs.

20. In a device of the character described, a fixed member, a movable member rotatably mounted on the fixed member, a friction element carried by said fixed member and having its contact surface arranged obliquely to the axis of said movable member, said movable member having a transverse portion provided with a friction surface arranged parallel with the contact surface of said friction element, and means to hold said movable member firmly in contact with said friction element.

21. In a device of the character described, a fixed member, a movable member rotatably mounted on the fixed member, a friction element carried by said fixed member and having its contact surface arranged obliquely to the axis of said movable member, said movable member having a transverse portion provided with a friction surface arranged parallel with the contact surface of said friction element, and springs forming the sole connection between said movable member and said fixed member and so arranged that the rotation of said movable member would place said springs under increased tension.

22. In a device of the character described, a fixed member, a movable member rotatably mounted on said fixed member and comprising a housing, a portion extending obliquely from said housing and having at its outer edge a flange, an annular friction element carried by said fixed member arranged within the flange of said movable member and having an oblique contact surface to engage the oblique portion of said movable member, and springs connecting said movable member with said fixed member and arranged to be placed under increased tension by the rotation of said movable member.

In testimony whereof, I affix my signature hereto.

CHARLES C. BLACKMORE.